United States Patent
Zhou et al.

(10) Patent No.: US 9,838,934 B2
(45) Date of Patent: Dec. 5, 2017

(54) METHOD FOR OPENING RADIO PIPELINE CAPABILITY AND APPARATUS THEREOF

(71) Applicant: Huawei Technologies Co., Ltd., Shenzhen (CN)

(72) Inventors: Yu Zhou, Shanghai (CN); Juntao Wu, Shanghai (CN); Chunchun Lv, Alger (DZ)

(73) Assignee: Huawei Technologies Co., Ltd., Shenzhen (CN)

( * ) Notice: Subject to any disclaimer, the term of this patent is extended or adjusted under 35 U.S.C. 154(b) by 158 days.

(21) Appl. No.: 14/874,269

(22) Filed: Oct. 2, 2015

(65) Prior Publication Data

US 2016/0029281 A1 Jan. 28, 2016

Related U.S. Application Data

(63) Continuation of application No. PCT/CN2013/073620, filed on Apr. 2, 2013.

(51) Int. Cl.
*H04W 28/02* (2009.01)
*H04W 36/26* (2009.01)
*H04W 4/00* (2009.01)
*H04W 72/04* (2009.01)
*H04W 28/24* (2009.01)
*H04W 88/12* (2009.01)

(52) U.S. Cl.
CPC ........... *H04W 36/26* (2013.01); *H04W 4/001* (2013.01); *H04W 28/24* (2013.01); *H04W 72/0493* (2013.01); *H04W 88/12* (2013.01)

(58) Field of Classification Search
None
See application file for complete search history.

(56) References Cited

U.S. PATENT DOCUMENTS 6,944,166 B1 * 9/2005 Perinpanathan ........ H04L 47/10
370/352
7,817,615 B1 * 10/2010 Breau ................... H04W 28/24
370/349

(Continued)

FOREIGN PATENT DOCUMENTS

CN 102196006 A 9/2011
CN 102196012 A 9/2011

(Continued)

OTHER PUBLICATIONS

Li, et al., "Toward Sofware-Defined Cellular Networks", 2012 European Workshop on Software Defined Networking, IEEE, Oct. 25, 2012, pp. 7-12.

*Primary Examiner* — Hassan Phillips
*Assistant Examiner* — Ayanah George
(74) *Attorney, Agent, or Firm* — Slater Matsil, LLP

(57) ABSTRACT

A method for opening radio pipeline capability and a collaborative controller are disclosed. In an embodiment the method includes receiving, by an access network collaborative controller, a request message from a capability opening gateway, wherein the request message carries a service requirement of a first user equipment UE, and controlling, by the collaborative controller, a first radio pipeline device according to the request message so that a radio pipeline resource allocated to the first UE meets the service requirement.

33 Claims, 10 Drawing Sheets

(56) References Cited

U.S. PATENT DOCUMENTS

| | | | |
|---|---|---|---|
| 2007/0115884 A1* | 5/2007 | Shang | H04W 36/30 370/331 |
| 2012/0122448 A1 | 5/2012 | Mueck et al. | |
| 2013/0019291 A1 | 1/2013 | Zou | |
| 2013/0040683 A1 | 2/2013 | Siomina et al. | |

FOREIGN PATENT DOCUMENTS

| | | |
|---|---|---|
| CN | 102340767 A | 2/2012 |
| CN | 102812771 A | 12/2012 |
| WO | 2012148482 A1 | 11/2012 |

* cited by examiner

METHOD FOR OPENING RADIO PIPELINE CAPABILITY AND APPARATUS THEREOF

This application is a continuation of International Application No. PCT/CN2013/073620, filed on Apr. 2, 2013, which is hereby incorporated by reference in its entirety.

TECHNICAL FIELD

Embodiments of the present invention relate to the communications field, and in particular, to a method for opening a radio pipeline capability and an apparatus thereof.

BACKGROUND

As an OTT (Over The Top) service develops rapidly, a mobile operator is faced with a dilemma of an increase in traffic but without an increase in revenue, and needs to seek a new revenue source to keep a stable revenue growth. Network capability opening is an attempt of the operator for an additional revenue source. The operator hopes to open network capabilities to third-party applications, thereby enhancing service experience of the third-party applications and implementing a new business model. The opening of network capabilities is classified into opening of query capabilities and opening of control capabilities. Query capabilities include acquiring context information, cell load and the like of a user, and control capabilities include setting quality of service (QoS) required for a service and the like.

An existing radio pipeline capability opening architecture mainly includes an application server, a capability opening gateway, a wireless core network device, and a radio access network device. A capability opening application programming interface (API) may be provided for the application server by using the capability opening gateway so that the application server acquires capability information on a radio network or controls the radio network. Specific functions of the foregoing components are as follows:

The capability opening gateway completes third-party authentication, acquires capabilities of the radio network, performs convergence and orchestration, and provides an abstraction capability for an API opening and management platform.

The API opening and management platform performs policy control and policy authorization, and is connected to the capability opening gateway to implement opening of a radio pipeline capability.

The wireless core network device includes a mobility management entity (MME), a serving gateway (S-GW), and a packet data network gateway (P-GW) in a long term evolution (LTE) system architecture, and includes a support GPRS serving node (SGSN) and a gateway GPRS support node (GGSN) in a universal mobile telecommunication system (UMTS) architecture. The wireless core network device is configured to enhance the GGSN/P-GW, send policy information on a UE and a cell to the capability opening gateway, and control an access network.

The radio access network device refers to an evolved base station (eNB or e-NodeB) in an LTE network, refers to a radio network controller (RNC) in a UMTS network, and refers to a base station control device (BSC) in a global system for mobile communications (GSM) system, and is configured to send context information and a cell state of a user to the capability opening gateway.

However, in the existing radio pipeline capability opening architecture, the capability opening gateway needs to establish interfaces with multiple radio access network devices and multiple wireless core network devices, and needs to perform convergence processing on different types of capability information. With continuous network expansion, there is a need to continuously update the capability opening gateway, and the capability opening gateway needs to process an increasing amount of information and becomes more complicated, which hinders network deployment and increases implementation difficulties. In addition, the capability opening gateway needs to implement control over users and cells by using a wireless core network device, which involves many interaction activities and leaves much room for improvement in its control speed and control effect, and user experience is to be improved.

SUMMARY

Embodiments of the present invention provide a method for opening a radio pipeline capability and an apparatus thereof, so that a radio pipeline capability on a radio access network side can be opened to a capability opening gateway by an access network collaborative controller.

According to a first aspect, an embodiment of the present invention provides a method for opening a radio pipeline capability, where the method includes: receiving, by an access network collaborative controller, a request message from a capability opening gateway, where the request message carries a service requirement of a first user equipment UE; and controlling, by the collaborative controller, a first radio pipeline device according to the request message so that a radio pipeline resource allocated to the first UE meets the service requirement.

With reference to the first aspect, in a first possible implementation manner, the first radio pipeline device includes at least one of the following: a base station controller BSC, an evolved base station e-NodeB, a radio network controller RNC, a radio access controller AC, and the first UE.

With reference to the first aspect or with reference to the first possible implementation manner of the first aspect, in a second possible implementation manner, the receiving, by the collaborative controller, a request message from a capability opening gateway includes: receiving a radio access technology RAT request message from the capability opening gateway, where the RAT request message carries identifier information on the first UE and a quality of service QoS requirement of the first UE.

With reference to the second possible implementation manner of the first aspect, in a third possible implementation manner, the controlling, by the collaborative controller, a first radio pipeline device according to the request message so that a radio pipeline resource allocated to the first UE meets the service requirement includes: determining, by the collaborative controller, a first cell meeting the QoS requirement according to the RAT request message, a radio network system supported by the first UE, and signal quality information on a serving cell and at least one neighboring cell of the first UE; and sending, by the collaborative controller, bearer control information to a second radio pipeline device currently providing service for the first UE, where the bearer control information is used to indicate that the first UE is carried in the first cell.

With reference to the third possible implementation manner of the first aspect, in a fourth possible implementation manner, after the sending, by the collaborative controller, bearer control information to a second radio pipeline device currently providing service for the first UE, the method further includes: determining, by the collaborative controller, a second cell meeting the QoS requirement from the at least one neighboring cell of the first UE when the current serving cell of the first UE does not meet the QoS requirement; and sending, by the collaborative controller, handover instruction information to the second radio pipeline device currently providing service for the first UE, where the handover instruction information is used to indicate that the first UE is handed over to the second cell.

With reference to the third or fourth possible implementation manner of the first aspect, in a fifth possible implementation manner, when none of the at least one neighboring cell and the current serving cell meets the QoS requirement, the collaborative controller sends a maximum QoS capability of the first UE to the capability opening gateway so that the capability opening gateway re-determines a QoS requirement of the first UE.

With reference to the third, fourth, or fifth possible implementation manner of the first aspect, in a sixth possible implementation manner, the second radio pipeline device includes at least one of the following: a BSC, an e-NodeB, and an RNC.

With reference to the second possible implementation manner of the first aspect, in a seventh possible implementation manner, the controlling, by the collaborative controller, a first radio pipeline device according to the request message includes: determining, by the collaborative controller according to the request message and signal quality information on at least one access point AP available for the first UE, a first AP from the at least one AP; and sending, by the collaborative controller, an access instruction message to the first UE included in the first radio pipeline device, where the access instruction message is used to indicate access of the first UE to the first AP.

With reference to the first aspect or with reference to any one of the first to seventh possible implementation manners of the first aspect, in an eighth possible implementation manner, the method further includes: receiving, by the collaborative controller, a first subscription message from the capability opening gateway, where the first subscription message is used to query capability information on at least one third radio pipeline device; and sending, by the collaborative controller according to the first subscription message, the capability information on the at least one third radio pipeline device to the capability opening gateway.

With reference to the eighth possible implementation manner of the first aspect, in a ninth possible implementation manner, the method further includes: sending, by the collaborative controller, a second subscription message to the at least one third radio pipeline device, where the second subscription message is used to indicate sending of the capability information on the at least one third radio pipeline device; receiving, by the collaborative controller, the capability information on the at least one third radio pipeline device, which is sent by the at least one third radio pipeline device according to the second subscription message; and the sending, by the collaborative controller according to the first subscription message, capability information on the at least one third radio pipeline device to the capability opening gateway includes: sending, by the collaborative controller according to the first subscription message, the capability information on the at least one third radio pipeline device, which is sent by the at least one third radio pipeline device, to the capability opening gateway.

With reference to the ninth possible implementation manner of the first aspect, in a tenth possible implementation manner, after the receiving, by the collaborative controller, the capability information on the at least one third radio pipeline device, which is sent by the at least one third radio pipeline device according to the second subscription message, the method further includes: performing, by the collaborative controller, system normalization processing on the capability information on the at least one third radio pipeline device; and the sending, by the collaborative controller according to the first subscription message, capability information on the at least one third radio pipeline device to the capability opening gateway includes: sending, by the collaborative controller according to the first subscription message, the capability information on the at least one third radio pipeline device to the capability opening gateway after system normalization processing.

With reference to the eighth, ninth or tenth possible implementation manner of the first aspect, in an eleventh possible implementation manner, the method further includes: receiving, by the collaborative controller, a subscription cancellation instruction from the capability opening gateway, where the subscription cancellation instruction is used to indicate that the collaborative controller stops sending the capability information on the at least one third radio pipeline device; and stopping, by the collaborative controller according to the capability information subscription cancellation instruction, sending the capability information on the at least one third radio pipeline device.

With reference to any one of the eighth to eleventh possible implementation manners of the first aspect, in a twelfth possible implementation manner, the third radio pipeline device includes at least one of the following: a BSC, an e-NodeB, an RNC, a radio AC, and a second UE; and the capability information on the at least one third radio pipeline device includes at least one of the following: context information on the second UE, load information on the e-NodeB, load information on a base station controlled by the BSC or the RNC, signal quality information on the base station controlled by the BSC or the RNC, as well as load information and signal quality information on a radio access point AP controlled by the radio AC.

With reference to any one of the first to twelfth possible implementation manners of the first aspect, in a thirteenth possible implementation manner, the method further includes: sending an information query request to the capability opening gateway, where the information query request is used to query policy information on a fourth radio pipeline device; and receiving the policy information on the fourth radio pipeline device, which is sent by the capability opening gateway according to the information query request.

With reference to the first aspect or with reference to any one of the first to thirteenth possible implementation manners of the first aspect, in a fourteenth possible implementation manner, before the receiving, by an access network collaborative controller, a capability request message from the capability opening gateway, the method further includes: sending, by the collaborative controller, a registration request message to the capability opening gateway, where the registration request message carries identifier information on at least one fifth radio pipeline device controlled by the collaborative controller, so that the capability opening gateway saves the identifier information on the at least one fifth radio pipeline device; and receiving, by the collaborative controller, a registration request acknowledgement that is sent, according to the registration request message, by the capability opening gateway, where the registration request acknowledgement is used to indicate that the capability opening gateway has successfully saved the identifier information on the at least one fifth radio pipeline device.

With reference to the first aspect or with reference to the fourteenth possible implementation manner of the first aspect, in a fifteenth possible implementation manner, the method further includes: sending, by the collaborative controller, an update request message to the capability opening gateway when the at least one fifth radio pipeline device changes, where the update request message is used to send the change, so that the capability opening gateway is further configured to update the saved identifier information on the at least one fifth radio pipeline device according to the update request message.

According to a second aspect, an embodiment of the present invention provides an access network collaborative controller, where the collaborative controller includes: a first receiving module, configured to receive a request message from a capability opening gateway, where the request message carries a service requirement of a first user equipment UE; and a controlling module, configured to control a first radio pipeline device according to the request message received by the first receiving module so that a radio pipeline resource allocated to the first UE meets the service requirement.

With reference to the second aspect, in a first possible implementation manner, the first radio pipeline device includes at least one of the following: a base station controller BSC, an evolved base station e-NodeB, a radio network controller RNC, a radio access controller AC, and the first UE.

With reference to the second aspect or with reference to the first possible implementation manner of the second aspect, in a second possible implementation manner, the first receiving module is specifically configured to receive a radio access technology RAT request message from the capability opening gateway, where the RAT request message carries identifier information on the first UE and a quality of service QoS requirement of the first UE.

With reference to the second possible implementation manner of the second aspect, in a third possible implementation manner, the controlling module includes: a first determining unit, configured to determine a first cell meeting the QoS requirement according to the RAT request message, a radio network system supported by the first UE, and signal quality information on a serving cell and at least one neighboring cell of the first UE; and a first sending unit, configured to send bearer control information to a second radio pipeline device currently providing service for the first UE, where the bearer control information is used to indicate that the first UE is carried in the first cell determined by the first determining unit.

With reference to the third possible implementation manner of the second aspect, in a fourth possible implementation manner, the collaborative controller further includes: a first determining module, configured to determine, after the sending unit sends the bearer control information to the second radio pipeline device currently providing service for the first UE and when the current serving cell of the first UE does not meet the QoS requirement, a second cell meeting the QoS requirement from the at least one neighboring cell of the first UE; and a first sending module, configured to send handover instruction information to the second radio pipeline device currently providing service for the first UE, where the handover instruction information is used to indicate that the first UE is handed over to the second cell determined by the first determining module.

With reference to the third or fourth possible implementation manner of the second aspect, in a fifth possible implementation manner, the collaborative controller further includes: a second sending module, configured to, when none of the at least one neighboring cell and the current serving cell meets the QoS requirement, send a maximum QoS capability of the first UE to the capability opening gateway, so that the capability opening gateway re-determines a QoS requirement of the first UE.

With reference to the third, fourth, or fifth possible implementation manner of the second aspect, in a sixth possible implementation manner, the second radio pipeline device includes at least one of the following: a BSC, an e-NodeB, and an RNC.

With reference to the second possible implementation manner of the second aspect, in a seventh possible implementation manner, the controlling module includes: a second determining unit, configured to determine, according to the request message and signal quality information on at least one access point AP available for the first UE, a first AP from the at least one AP; and a second sending unit, configured to send an access instruction message to the first UE, where the access instruction message is used to indicate access of the first UE included in the first radio pipeline device to the first AP determined by the second determining unit.

With reference to the second aspect or with reference to any one of the first to seventh possible implementation manners of the second aspect, in an eighth possible implementation manner, the first receiving module is further configured to receive a first subscription message from the capability opening gateway, where the first subscription message is used to query capability information on at least one third radio pipeline device; and the collaborative controller further includes: a third sending module, configured to send the capability information on the at least one third radio pipeline device to the capability opening gateway according to the first subscription message received by the first receiving module.

With reference to the eighth possible implementation manner of the second aspect, in a ninth possible implementation manner, the collaborative controller further includes: a fourth sending module, configured to send a second subscription message to the at least one third radio pipeline device, where the second subscription message is used to indicate sending of the capability information on the at least one third radio pipeline device; and a second receiving module, configured to receive the capability information on the at least one third radio pipeline device, which is sent by the at least one third radio pipeline device according to the second subscription message sent by the fourth sending module; and the third sending module is specifically configured to send, according to the first subscription message, the capability information on the at least one third radio pipeline device, which is received by the second receiving module, to the capability opening gateway.

With reference to the ninth possible implementation manner of the second aspect, in a tenth possible implementation manner, the collaborative controller further includes: a processing module, configured to perform system normalization processing on the capability information on the at least one third radio pipeline device, which is received by the second receiving module; and the third sending module is specifically configured to send, according to the first subscription message, the capability information on the at least one third radio pipeline device to the capability opening gateway after system normalization processing performed by the processing module.

With reference to the eighth, ninth or tenth possible implementation manner of the second aspect, in an eleventh possible implementation manner, the first receiving module is further configured to receive a subscription cancellation instruction from the capability opening gateway, where the subscription cancellation instruction is used to indicate that the collaborative controller stops sending the capability information on the at least one third radio pipeline device; and the collaborative controller further includes: a sending stopping module, configured to stop, according to the subscription cancellation instruction received by the first receiving module, sending the capability information on the at least one third radio pipeline device.

With reference to any one of the eighth to eleventh possible implementation manners of the second aspect, in a twelfth possible implementation manner, the third radio pipeline device includes at least one of the following: a BSC, an e-NodeB, an RNC, a radio AC, and a second UE; and the capability information on the at least one third radio pipeline device includes at least one of the following: context information on the second UE, load information on the e-NodeB, load information on a base station controlled by the BSC or the RNC, signal quality information on the base station controlled by the BSC or the RNC, as well as load information and signal quality information on a radio access point AP controlled by the radio AC.

With reference to the second aspect or with reference to any one of the first to twelfth possible implementation manners of the second aspect, in a thirteenth possible implementation manner, the collaborative controller further includes: a fifth sending module, configured to send an information query request to the capability opening gateway, where the information query request is used to query policy information on a fourth radio pipeline device; and the first receiving module is specifically configured to receive the policy information on the fourth radio pipeline device, which is sent by the capability opening gateway according to the information query request sent by the fifth sending module.

With reference to the second aspect or with reference to any one of the first to thirteenth possible implementation manners of the second aspect, in a fourteenth possible implementation manner, the collaborative controller further includes: a sixth sending module, configured to, before the first receiving module receives the capability request message from the capability opening gateway, send a registration request message to the capability opening gateway, where the registration request message carries identifier information on at least one fifth radio pipeline device controlled by the collaborative controller, so that the capability opening gateway saves the identifier information on the at least one fifth radio pipeline device; and the first receiving module is further configured to receive a registration request acknowledgement that is sent, according to the registration request message sent by the sixth sending module, by the capability opening gateway, where the registration request acknowledgement is used to indicate that the capability opening gateway has successfully saved the identifier information on the at least one fifth radio pipeline device.

With reference to the second aspect or with reference to the fourteenth possible implementation manner of the second aspect, in a fifteenth possible implementation manner, the sixth sending module is further configured to send an update request message to the capability opening gateway when the at least one fifth radio pipeline device changes, where the update request message is used to send the change, so that the capability opening gateway is further configured to update the saved identifier information on the at least one fifth radio pipeline device according to the update request message.

According to a third aspect, an embodiment of the present invention provides a system for opening a radio pipeline capability, where the system includes: the access network collaborative controller of the second aspect or any one of the first to fifteenth possible implementation manners of the second aspect, a capability opening gateway, and at least one fifth radio pipeline device.

With reference to the third aspect, in a first possible implementation manner, the at least one fifth radio pipeline device includes at least one of the following: a base station controller BSC, an evolved base station e-NodeB, a radio network controller RNC, a radio access controller AC, and a second UE.

Based on the foregoing technical solution, with the method for opening a radio pipeline capability and the apparatus thereof according to the embodiments of the present invention, and by using an access network collaborative controller, information is transmitted between a radio pipeline device and a capability opening gateway, and the radio pipeline device is controlled according to a requirement of the capability opening gateway, so as to open a radio pipeline capability on an RAN side for the capability opening gateway. This can reduce complexity of the capability opening gateway, improve scalability of a system for opening a radio pipeline capability, and control a radio network according to a service need, thereby optimizing services and enhancing user experience.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

It should be understood that the technical solutions in the embodiments of the present invention may apply to various types of communications systems, for example, a Global System for Mobile communications (GSM) system, a Code Division Multiple Access (CDMA) system, a Wideband Code Division Multiple Access (WCDMA) system, a general packet radio service (GPRS) system, a Long Term Evolution (LTE) system, an LTE Frequency Division Duplex (FDD) system, an LTE Time Division Duplex (TDD) system, a Universal Mobile Telecommunication System (UMTS), a Worldwide Interoperability For Microwave Access (WiMAX) communications system, and the like.

It should also be understood that a user equipment (UE) may be called a terminal (Terminal), a mobile station (MS), or a mobile terminal in the embodiments of the present invention. The user equipment may communicate with one or multiple core networks via a radio access network (RAN). For example, the user equipment may be a mobile phone (or called a "cellular" phone) or a computer equipped with a mobile terminal. For example, the user equipment may also be a portable, pocket, handheld, computer-embedded, or vehicle-mounted mobile apparatus, which exchanges voices and/or data with the radio access network.

It should also be understood that a base station may be a base transceiver station (BTS) in the GSM or CDMA system, a NodeB in the WCDMA system, or an evolved base station (eNB) in the LTE system according to the embodiments of the present invention, which is not limited by the present invention.

Figure 1:
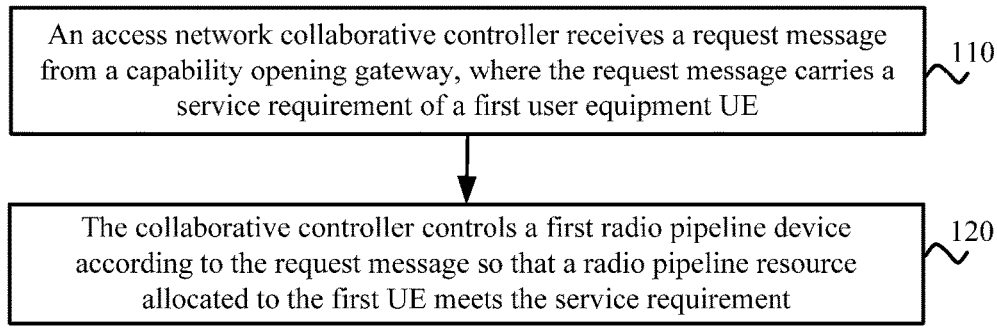
FIG. 1 is a schematic flowchart of a method for opening a radio pipeline capability according to an embodiment of the present invention.

FIG. 1 is a schematic flowchart of a method 100 for opening a radio pipeline capability according to an embodiment of the present invention. The method may be implemented by a collaborative controller in a radio access network. As shown in FIG. 1, the method 100 includes:

S110. An access network collaborative controller receives a request message from a capability opening gateway, where the request message carries a service requirement of a first user equipment UE.

S120. The collaborative controller controls a first radio pipeline device according to the request message so that a radio pipeline resource allocated to the first UE meets the service requirement.

In the embodiment of the present invention, when receiving the service requirement of the capability opening gateway for the first UE, the collaborative controller performs algorithm judgment according to a current state of a radio network to determine the radio pipeline resource to be allocated to the first UE to meet the service requirement, and controls the first radio pipeline device, so that the radio pipeline resource allocated to the first UE meets the service requirement.

Therefore, with the method for opening a radio pipeline capability according to the embodiment of the present invention, and by using an access network collaborative controller, information is transmitted between a radio pipeline device and a capability opening gateway, and the radio pipeline device is controlled according to a requirement of the capability opening gateway, so as to open a radio pipeline capability on an RAN side for the capability opening gateway. This can reduce complexity of the capability opening gateway, improve scalability of a system for opening a radio pipeline capability, and control the radio network according to a service need, thereby optimizing services and enhancing user experience.

In S120, optionally, the first radio pipeline device may include at least one of the following: a base station control device BSC, an evolved base station e-NodeB, a radio network controller RNC, a radio access controller AC, and the first UE. Optionally, the first radio pipeline device may also include any other device of the access network, and the embodiment of the present invention is not limited thereto.

Optionally, the radio pipeline resource may include at least one of the following: channel quality, channel rate, transmission delay, and bandwidth, but the embodiment of the present invention is not limited thereto.

In the embodiment of the present invention, a first interface is provided between the collaborative controller and the capability opening gateway, where the first interface may be configured to transmit capability information on the radio pipeline device, which is sent by the collaborative controller to the capability opening gateway, and policy information on the radio pipeline device, which is delivered by the capability opening gateway to the collaborative controller, and may also be configured to transmit the service requirement of the capability opening gateway for the first UE. Optionally, a second interface may be provided between the collaborative controller and the e-NodeB, where the second interface may be configured to transmit state information on an LTE cell and a command of the collaborative controller for controlling the e-NodeB. Optionally, a third interface may be provided between the collaborative controller and the BSC/RNC, where the third interface may be configured to transmit cell state information and user information on the BSC/RNC and a command of the collaborative controller for controlling the BSC/RNC. Optionally, a fourth interface may be provided between the collaborative controller and the AC, where the fourth interface is configured to transmit WI-FI state information and a command of the collaborative controller for controlling the AC. Optionally, a fifth interface may be provided between the collaborative controller and the first UE, where the fifth interface may be configured to support the collaborative controller to discover and select a WI-FI access network. However, the embodiment of the present invention is not limited thereto.

When the collaborative controller needs to control the first UE, the collaborative controller may send a control command to a radio pipeline network element that provides service for the first UE, such as the e-NodeB, the BSC/RNC, or the AC, and then the radio pipeline network element completes state adjustment interaction with the first UE by using a process defined by an existing 3GPP protocol. Optionally, when there is an interface between the collaborative controller and the first UE, the collaborative controller may also send the control command directly to the first UE to control the first UE, for example, to control access of the first UE to WI-FI. However, the embodiment of the present invention is not limited thereto.

In S110, the service requirement in the request message may be a quality of service requirement of a service of the first UE, a bearer bandwidth requirement of the first UE, or a service delay requirement of the first UE. The embodiment of the present invention is not limited thereto.

Optionally, in S110, that a collaborative controller receives a request message from a capability opening gateway includes:

S111. The collaborative controller receives a radio access technology RAT request message from the capability opening gateway, where the RAT request message carries identifier information on the first UE and a quality of service QoS requirement of the first UE.

The capability opening gateway may acquire context information on the first UE from a wireless core network. For example, the context information may include one or more of the following: a temporary identifier, an international mobile subscriber identity (IMSI), and a mobile subscriber number MSSISDN of the first UE, and a subscription type and serving cell information on the first UE, and the like. According to the context information on the first UE and information, which is saved by the capability opening gateway, on radio pipeline devices controlled by various collaborative controllers, a collaborative controller providing service for the first UE is determined and the RAT request message is sent to the collaborative controller.

The RAT request message is used to request to carry the first UE on a proper radio network system to meet the QoS requirement of the first UE. Optionally, the RAT request message may further carry a radio network system list subscribed by the first UE, for example, including one or more of LTE, UMTS, GSM, WLAN, and the like, and a current RAT type of the first UE. The embodiment of the present invention is not limited thereto.

The collaborative controller may determine an optimal radio network system meeting the QoS requirement from the radio network system list and controls the first UE to be carried on the optimal radio network system. Specifically, the collaborative controller may select a radio cellular network cell meeting the QoS requirement from a current serving cell and at least one neighboring cell of the first UE. Alternatively, the collaborative controller may, according to the current state of the radio network, indicate access of the first UE to a wireless local area network (WLAN) or control access of the first UE to a WLAN and a radio cellular network cell at the same time to implement traffic offload (offload) for the first UE by concurrent transmission. That is to say, UE data is divided into two parts: one part of data streams are transmitted in the radio cellular network and another part of data streams are transmitted in the WLAN. However, the embodiment of the present invention is not limited thereto.

Figure 2:
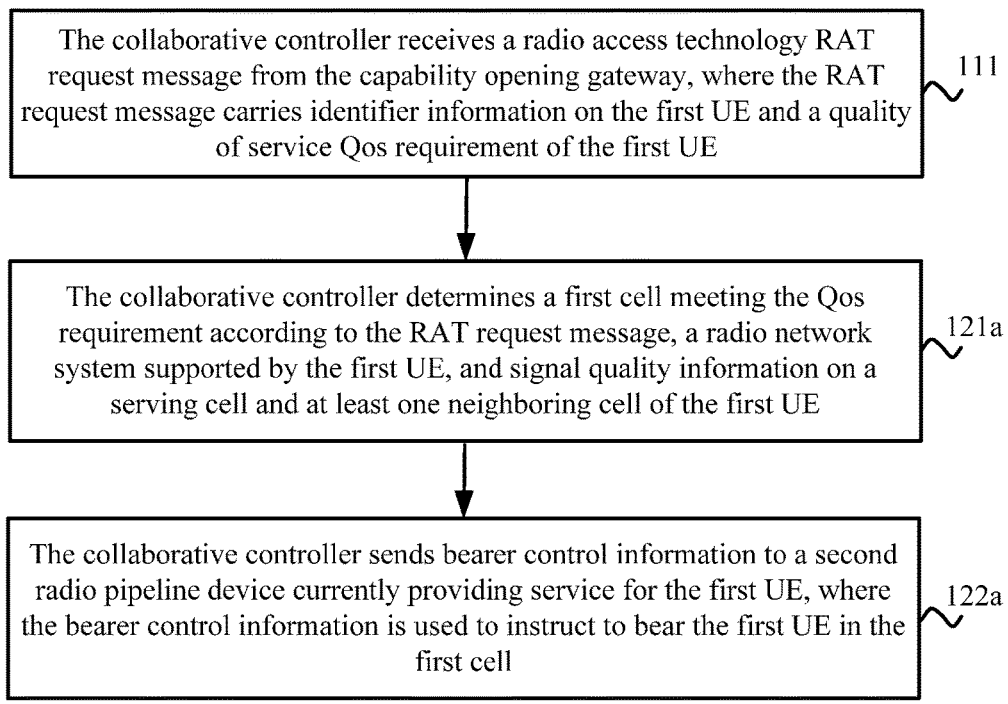
FIG. 2 is another schematic flowchart of a method for opening a radio pipeline capability according to an embodiment of the present invention.

Optionally, as shown in FIG. 2, in S120, that the collaborative controller controls a first radio pipeline device according to the request message so that a radio pipeline resource allocated to the first UE meets the service requirement includes:

S121*a*. The collaborative controller determines a first cell meeting the QoS requirement according to the RAT request message, a radio network system supported by the first UE, and signal quality information on the serving cell and the at least one neighboring cell of the first UE.

S122*a*. The collaborative controller sends bearer control information to a second radio pipeline device currently providing service for the first UE, where the bearer control information is used to indicate that the first UE is carried in the first cell.

The second radio pipeline device may include at least one of the following: an e-NodeB, a BSC, and an RNC. The collaborative controller may acquire signal quality information, interference, power, and cell load information on the serving cell and at least one neighboring cell of the first UE, and select, according to the foregoing information, a first cell meeting the QoS requirement from the serving cell and the at least one neighboring cell. Then, the collaborative controller may indicate that the radio pipeline network element providing service for the first UE, such as an e-NodeB or a BSC/RNC, carries the first UE in the first cell. When the first cell is a neighboring cell of the first UE, the collaborative controller may indicate that the first UE is handed over to the first cell to meet the QoS requirement of the first UE. The first cell may only meet the QoS requirement, or may not only meet the QoS requirement but also be light-loaded, and the embodiment of the present invention is not limited thereto.

The collaborative controller is not limited to one manner for acquiring the signal quality information and cell load information on the serving cell and the at least one neighboring cell of the first UE. Alternatively, the collaborative controller may acquire the foregoing information by receiving information actively sent by a base station or base station control device providing service for the first UE. Alternatively, the collaborative controller may also send an instruction to the base station or base station control device currently providing service for the first UE, requesting the base station or base station control device to report the foregoing information. Alternatively, some or all of the foregoing information may also be acquired from information sent by the first UE. The embodiment of the present invention is not limited thereto.

Optionally, the collaborative controller may further send an implementation state of the first radio pipeline device to the capability opening gateway so that the capability opening gateway performs processing such as charging on the first UE.

Figure 3:
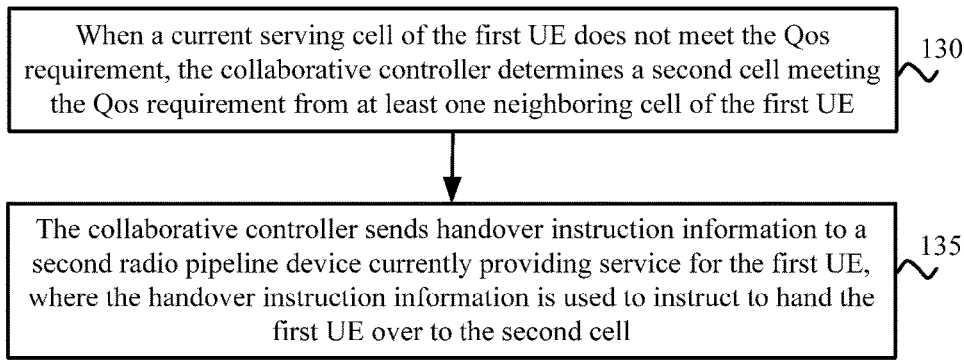
FIG. 3 is still another schematic flowchart of a method for opening a radio pipeline capability according to an embodiment of the present invention.

Optionally, after the first UE is carried in the first cell meeting the QoS requirement, the collaborative controller may also perform continuous monitoring on QoS of the first UE, re-determine a second cell meeting the QoS requirement from the at least one neighboring cell of the first UE when the current QoS of the first UE does not meet the QoS requirement, and control the first UE to perform handover. Therefore, optimally, in another embodiment, as shown in FIG. 3, the method 100 after S122a further includes:

S130. When the current serving cell of the first UE does not meet the QoS requirement, the collaborative controller determines a second cell meeting the QoS requirement from the at least one neighboring cell of the first UE.

S135. The collaborative controller sends handover instruction information to the second radio pipeline device currently providing service for the first UE, where the handover instruction information is used to indicate that the first UE is handed over to the second cell.

Optionally, when the collaborative controller determines that none of the neighboring cells and the current serving cell of the first UE meets the QoS requirement, the collaborative controller may report the event to the capability opening gateway. Optionally, the collaborative controller may also send maximum QoS that the first UE can reach so that the capability opening gateway adjusts a service policy of the first UE. Optionally, in another embodiment, the method 100 further includes:

S140. When none of the at least one neighboring cell and the current serving cell meets the QoS requirement, the collaborative controller sends a maximum QoS capability of the first UE to the capability opening gateway, so that the capability opening gateway re-determines a QoS requirement of the first UE.

Therefore, after receiving an instruction from the capability opening gateway, the collaborative controller may keep monitoring services of the first UE within a period of time or before receiving a QoS requirement cancellation instruction from the capability opening gateway, so that the QoS of the first UE always meets the QoS requirement. Compared with the prior art where a capability opening gateway controls QoS of the first UE via a core network, this not only controls the first UE to perform inter-RAT handover according to a service need but also improves timeliness and effectiveness of service control, ensures service quality, and enhances user experience.

Figure 4:
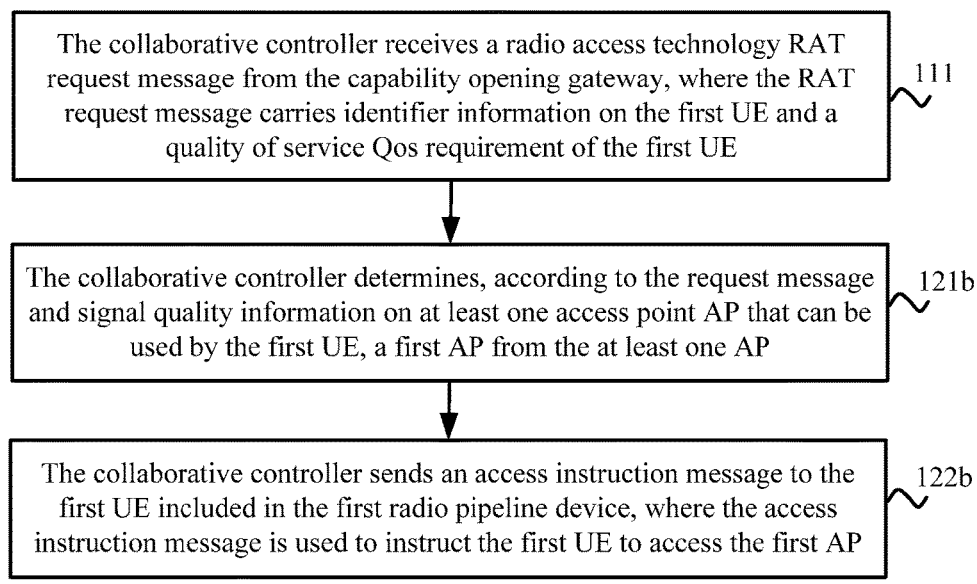
FIG. 4 is still another schematic flowchart of a method for opening a radio pipeline capability according to an embodiment of the present invention.

Optionally, when the collaborative controller has a WI-FI discovery and selection function, the collaborative controller may also control access of the UE to WI-FI according to a current radio network state and a current service need. Accordingly, in another embodiment, as shown in FIG. 4, in S120, that the collaborative controller controls a first radio pipeline device according to the request message includes:

S121b. The collaborative controller determines, according to the request message and signal quality information on at least one access point AP available for the first UE, a first AP from the at least one AP.

S122b. The collaborative controller sends an access instruction message to the first UE included in the first radio pipeline device, where the access instruction message is used to indicate access of the first UE to the first AP.

The collaborative controller may send instruction information to the first UE to instruct the first UE to enable WI-FI scanning, and select, according to a scanning result of the first UE, system load, and the QoS requirement, an AP that can provide optimal service for the first UE from the at least one AP sent by the first UE. After that, the collaborative controller may indicate access of the first UE to the AP, or implement traffic offload between the radio cellular network and the WLAN by concurrent transmission. Optionally, the collaborative controller may further perform periodic monitoring on the QoS of the first UE and send the monitored QoS to the capability opening gateway so that the capability opening gateway adjusts a policy on the first UE or performs charging and settlement. The embodiment of the present invention is not limited thereto.

Optionally, the collaborative controller may, by using the foregoing control over the radio pipeline device, open a deep packet inspection or shallow packet inspection capability, a cell-specific cell broadcast capability, and a user priority modification capability to the capability opening gateway, but the embodiment of the present invention is not limited thereto.

Optionally, in another embodiment, the collaborative controller may further provide an information query capability for the capability opening gateway so that the capability opening gateway can open the information query capability to a third-party application. Specifically, the information may include physical layer information, radio layer information, and session layer information.

The physical layer capability information may include: information on a radio pipeline device controlled by the collaborative controller, transmission state information on the radio pipeline device, and virtual resource information on the radio pipeline device, for example, information on available computing and storage capabilities of the system, and the like. The radio layer capability information may include: user context information, user QoS information (for example, a QoS delay of a service flow, uplink and downlink rates, uplink and downlink traffic, an available bandwidth, and like information), user location information, user performance measurement information (for example, quality information on a serving cell and a neighboring cell of a user or abstracted quality level information), user call log information, and, in a case of multiple radio network systems, load information on cells and/or APs in the radio network systems, air interface quality information on the cells and/or APs in the radio network systems, and spectrum resources and hotspot WI-FI information in the radio network systems, and the like. The session layer capability information may include: user camping information and the like.

Figure 5:
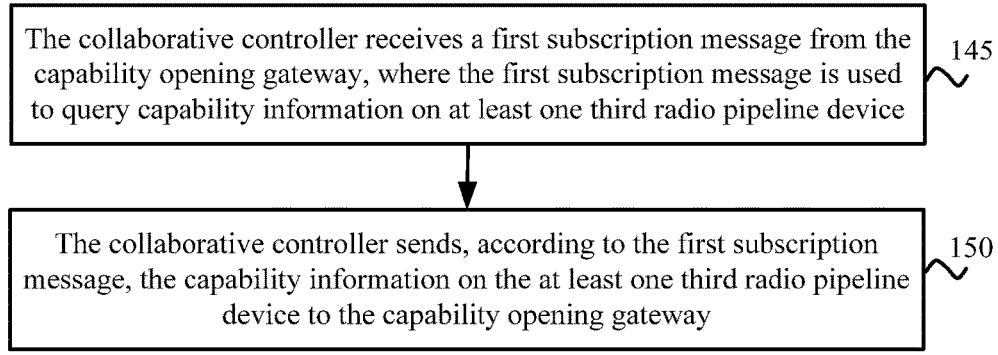
FIG. 5 is still another schematic flowchart of a method for opening a radio pipeline capability according to an embodiment of the present invention.

Optionally, the collaborative controller may provide the capability opening gateway with radio pipeline information used to indicate a radio pipeline state. As shown in FIG. 5, the method 100 further includes:

S145. The collaborative controller receives a first subscription message from the capability opening gateway, where the first subscription message is used to query capability information on at least one third radio pipeline device.

S150. The collaborative controller sends the capability information on the at least one third radio pipeline device to the capability opening gateway according to the first subscription message.

Optionally, the collaborative controller may further actively send the capability information on the at least one third radio pipeline device to the capability opening gateway, but the embodiment of the present invention is not limited thereto. The at least one third radio pipeline device may include at least one of the following: a BSC, an e-NodeB, an RNC, a radio AC, and a second UE. The at least one third radio pipeline device may be the same as the first radio pipeline device, may include the first radio pipeline device, or may be a subset of the first radio pipeline device; and the second UE may be the same as the first UE or may be different from the first UE. However, the embodiment of the present invention is not limited thereto.

Accordingly, the capability information on the at least one third radio pipeline device may include at least one of the following: context information on the second UE, load information on the e-NodeB, load information on a base station controlled by the BSC or the RNC, signal quality information on the base station controlled by the BSC or the RNC, and load information and signal quality information on a radio access point AP controlled by the radio AC. Optionally, the first subscription message may carry a subscribed capability information type, an identifier keyword of the capability information, and a sending period. Accordingly, the collaborative controller may periodically send the capability information to the capability opening gateway according to the first subscription message, or may be triggered by an event to send the capability information to the capability opening gateway, and the embodiment of the present invention is not limited thereto.

Figure 6:
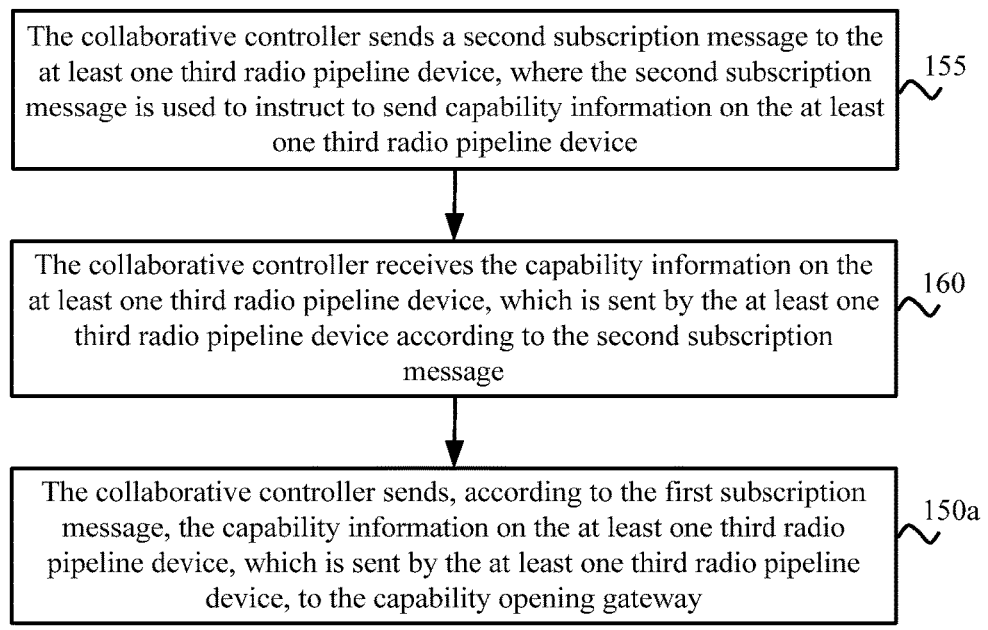
FIG. 6 is still another schematic flowchart of a method for opening a radio pipeline capability according to an embodiment of the present invention.

When the collaborative controller itself has stored the capability information, the collaborative controller may directly send the capability information to the capability opening gateway. Optionally, when the collaborative controller itself does not have the capability information on the at least one third radio pipeline device, the collaborative controller may acquire the capability information from one or more devices in the at least one third radio pipeline device. Optionally, as shown in FIG. 6, the method 100 further includes:

S155. The collaborative controller sends a second subscription message to the at least one third radio pipeline device, where the second subscription message is used to indicate sending of the capability information on the at least one third radio pipeline device.

S160. The collaborative controller receives the capability information on the at least one third radio pipeline device, which is sent by the at least one third radio pipeline device according to the second subscription message.

Accordingly, in S150, that the collaborative controller sends the capability information on the at least one third radio pipeline device to the capability opening gateway according to the first subscription message includes:

S150a. The collaborative controller sends the capability information on the at least one third radio pipeline device, which is sent by the at least one third radio pipeline device, to the capability opening gateway according to the first subscription message.

Optionally, the collaborative controller may acquire the capability information on the at least one third radio pipeline device from the at least one third pipeline device respectively, may acquire capability information on some or all devices in the at least one third radio pipeline device from several third radio pipeline devices in the at least one third radio pipeline device, or may acquire capability information on all devices in the at least one third radio pipeline device from one third radio pipeline device in the at least one third pipeline device, and the embodiment of the present invention is not limited thereto.

Figure 7:
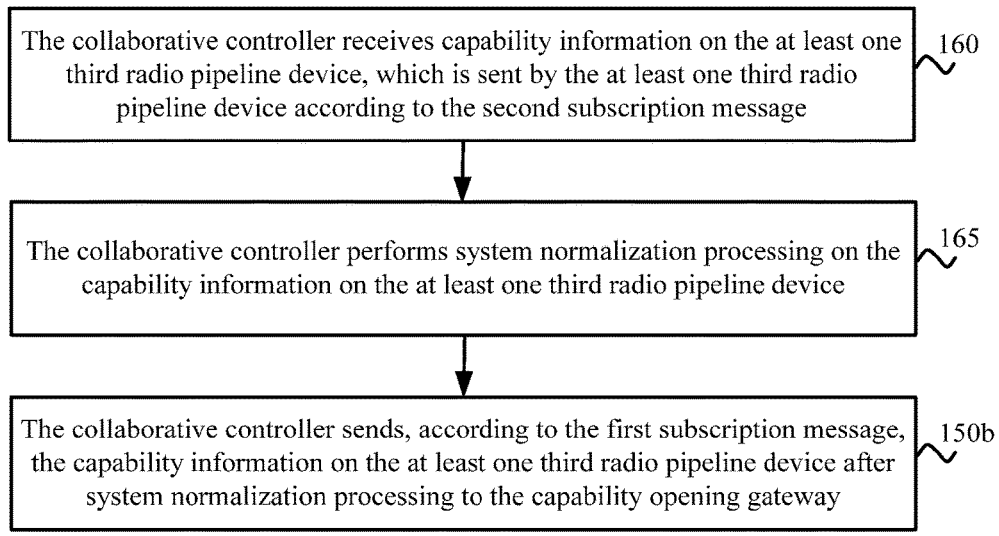
FIG. 7 is still another schematic flowchart of a method for opening a radio pipeline capability according to an embodiment of the present invention.

Optionally, when the at least one third radio pipeline device belongs to at least one radio network system, the collaborative controller may perform system normalization processing on the capability information on the at least one third radio pipeline device, that is, the collaborative controller abstracts the capability information on the at least one third radio pipeline device, unifies formats of the capability information according to an RAN, and shields differences among the radio network systems. Therefore, optionally, in another embodiment, as shown in FIG. 7, after S160, the method 100 further includes:

S165. The collaborative controller performs system normalization processing on the capability information on the at least one third radio pipeline device.

Accordingly, in S150, that the collaborative controller sends the capability information on the at least one third radio pipeline device to the capability opening gateway according to the first subscription message includes:

S150b. The collaborative controller sends, according to the first subscription message, the capability information on the at least one third radio pipeline device to the capability opening gateway after system normalization processing.

Therefore, the capability opening gateway no longer needs to perform system normalization processing on the capability information, thereby reducing complexity of the capability opening gateway. In addition, when a new radio network system is added to the system, only the collaborative controller needs to be adjusted and there is no need to update the capability opening gateway which is at a higher level, thereby improving scalability of the entire system.

Figure 8:
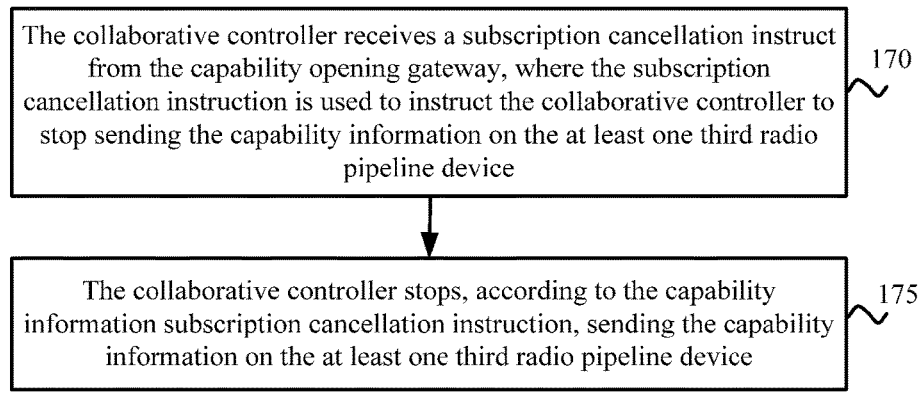
FIG. 8 is still another schematic flowchart of a method for opening a radio pipeline capability according to an embodiment of the present invention.

Optionally, in another embodiment, as shown in FIG. 8, the method 100 further includes:

S170. The collaborative controller receives a subscription cancellation instruction from the capability opening gateway, where the subscription cancellation instruction is used to indicate that the collaborative controller stops sending the capability information on the at least one third radio pipeline device.

S175. The collaborative controller stops, according to the capability information subscription cancellation instruction, sending the capability information on the at least one third radio pipeline device.

Optionally, the collaborative controller may further send a cancellation acknowledgement to the capability opening gateway to agree to stop sending the capability information on the at least one third radio pipeline device; and optionally, the collaborative controller may further send instruction information to the at least one third radio pipeline device according to the subscription cancellation instruction to indicate that the at least one third radio pipeline device stops sending the capability information, but the embodiment of the present invention is not limited thereto.

Figure 9:
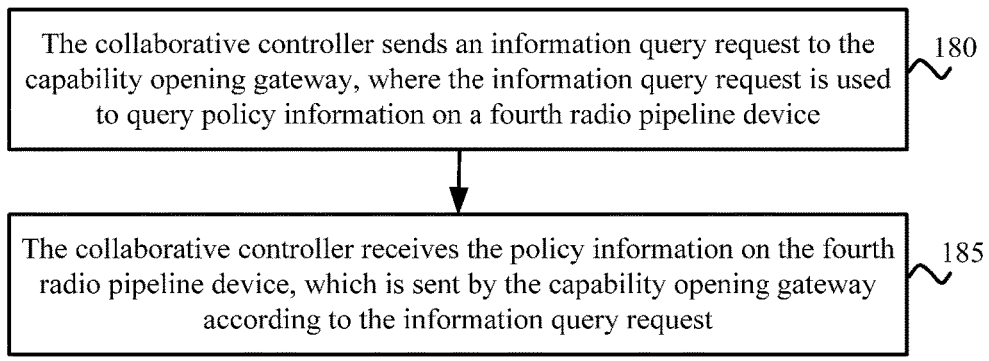
FIG. 9 is still another schematic flowchart of a method for opening a radio pipeline capability according to an embodiment of the present invention.

Optionally, the collaborative controller may further query the capability opening gateway for policy information of the wireless core network on a fourth radio pipeline device, for example, user right of a UE or a QoS requirement of a service. The capability opening gateway may acquire the policy information from the wireless core network and deliver the policy information to the collaborative controller. Accordingly, in another embodiment, as shown in FIG. 9, the method 100 further includes:

S180. The collaborative controller sends an information query request to the capability opening gateway, where the information query request is used to query the policy information on the fourth radio pipeline device.

S185. The collaborative controller receives the policy information on the fourth radio pipeline device, which is sent by the capability opening gateway according to the information query request.

The fourth radio pipeline device may include at least one of the following: a BSC, an e-NodeB, an RNC, a radio AC, and a second UE. The fourth radio pipeline device may be the same as the first radio pipeline device, the second radio pipeline device or the at least one third radio pipeline device, may include the first radio pipeline device and/or the second radio pipeline device and/or the at least one third radio pipeline device, or may be a subset of the first radio pipeline device and/or the second radio pipeline device and/or the at least one third radio pipeline device, and the embodiment of the present invention is not limited thereto.

Figure 10:
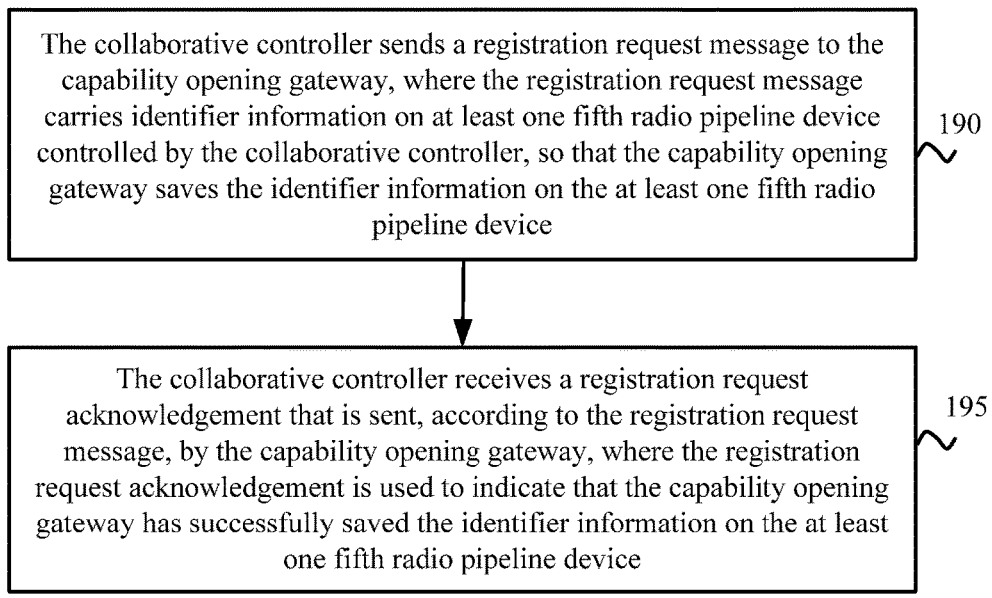
FIG. 10 is still another schematic flowchart of a method for opening a radio pipeline capability according to an embodiment of the present invention.

Optionally, after the collaborative controller is started and has established a transmission link connection with the capability opening gateway, the collaborative controller may register information on radio pipeline devices managed by the collaborative controller with the capability opening gateway, for example, an identifier of an e-NodeB, an identifier of an RNC, and a cell identifier of a BSC, and the like, so that the capability opening gateway acquires, in a radio pipeline capability opening process, a collaborative controller providing service for the user equipment according to an identifier of an e-NodeB providing service for the user equipment, an identifier of an RNC providing service for the user equipment, or a cell identifier of a BSC providing service for the user equipment. Accordingly, in another embodiment, as shown in FIG. 10, before S110, the method 100 further includes:

S190. The collaborative controller sends a registration request message to the capability opening gateway, where the registration request message carries identifier information on at least one fifth radio pipeline device controlled by the collaborative controller, so that the capability opening gateway saves the identifier information on the at least one fifth radio pipeline device.

S195. The collaborative controller receives a registration request acknowledgement that is sent, according to the registration request message, by the capability opening gateway, where the registration request acknowledgement is used to indicate that the capability opening gateway has successfully saved the identifier information on the at least one fifth radio pipeline device.

The at least one fifth radio pipeline device may include at least one of the following: a BSC, an e-NodeB, an RNC, a radio AC, and a second UE. The at least one fifth radio pipeline device may be all radio pipeline devices managed by the collaborative controller, but the embodiment of the present invention is not limited thereto.

Optionally, when at least one radio pipeline device managed by the collaborative controller changes, for example, a radio pipeline device is added or deleted, the capability opening gateway may be notified of the change in real time. Accordingly, in another embodiment, the method 100 further includes:

S199. When the at least one fifth radio pipeline device changes, the collaborative controller sends an update request message to the capability opening gateway, where the update request message is used to send the change, so that the capability opening gateway is further configured to update the saved identifier information on the at least one fifth radio pipeline device according to the update request message.

It should be understood that sequence numbers of the foregoing processes do not represent an order of implementation, and that the order of implementing the processes depends on functions and inherent logics of the processes, and should not constitute any limitation on the implementation process of the embodiments of the present invention.

Therefore, with the method for opening a radio pipeline capability according to the embodiments of the present invention, and by using an access network collaborative controller, information is transmitted between a radio pipeline device and a capability opening gateway, and the radio pipeline device is controlled according to a requirement of the capability opening gateway, so as to open a radio pipeline capability on the RAN side for the capability opening gateway. This can reduce complexity of the capability opening gateway, improve scalability of the system for opening a radio pipeline capability, and control the radio network according to a service need, thereby optimizing services and enhancing user experience.

The method for opening a radio pipeline capability according to the embodiments of the present invention has been described in detail with reference to FIG. 1 to FIG. 10. The following describes an access network collaborative controller and a system for opening a radio pipeline capability according to the embodiments of the present invention with reference to FIG. 11 to FIG. 24.

Figure 11:
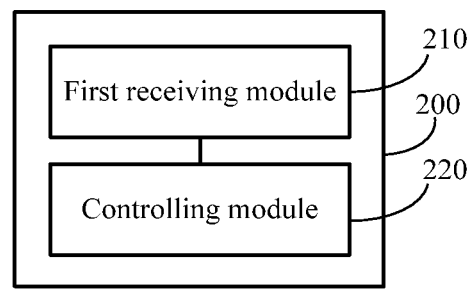
FIG. 11 is a schematic block diagram of an access network collaborative controller according to an embodiment of the present invention.

FIG. 11 is a schematic block diagram of an access network collaborative controller 200 according to an embodiment of the present invention. As shown in FIG. 11, the collaborative controller 200 includes:

a first receiving module 210, configured to receive a request message from a capability opening gateway, where the request message carries a service requirement of a first user equipment UE; and a controlling module 220, configured to control a first radio pipeline device according to the request message received by the first receiving module 210 so that a radio pipeline resource allocated to the first UE meets the service requirement.

Therefore, by using the access network collaborative controller according to the embodiments of the present invention, information is transmitted between a radio pipeline device and a capability opening gateway, and the radio pipeline device is controlled according to a requirement of the capability opening gateway, so as to open a radio pipeline capability on an RAN side for the capability opening gateway. This can reduce complexity of the capability opening gateway, improve scalability of a system for opening a radio pipeline capability, and control a radio network according to a service need, thereby optimizing services and enhancing user experience.

Optionally, the first radio pipeline device includes at least one of the following: a base station controller BSC, an evolved base station e-NodeB, a radio network controller RNC, a radio access controller AC, and the first UE.

Optionally, the first receiving module 210 is specifically configured to receive a radio access technology RAT request message from the capability opening gateway, where the RAT request message carries identifier information on the first UE and a quality of service QoS requirement of the first UE.

Figure 12:
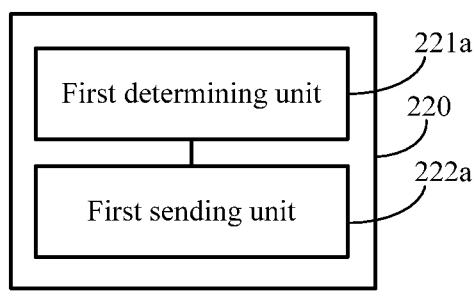
FIG. 12 is another schematic block diagram of an access network collaborative controller according to an embodiment of the present invention.

Optionally, as shown in FIG. 12, the controlling module 220 includes:

a first determining unit 221a, configured to determine a first cell meeting the QoS requirement according to the RAT request message, a radio network system supported by the first UE, and signal quality information on a serving cell and at least one neighboring cell of the first UE; and a first sending unit 222*a*, configured to send bearer control information to a second radio pipeline device currently providing service for the first UE, where the bearer control information is used to indicate that the first UE is carried in the first cell determined by the first determining unit 221*a*.

Figure 13:
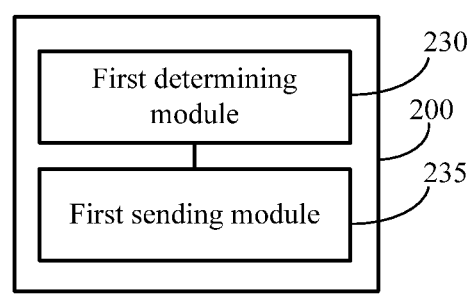
FIG. 13 is still another schematic block diagram of an access network collaborative controller according to an embodiment of the present invention.

Optionally, in another embodiment, as shown in FIG. 13, the collaborative controller 200 further includes:

a first determining module 230, configured to determine, after the sending unit 222*a* sends the bearer control information to the second radio pipeline device currently providing service for the first UE and when the current serving cell of the first UE does not meet the QoS requirement, a second cell meeting the QoS requirement from the at least one neighboring cell of the first UE; and a first sending module 235, configured to send handover instruction information to the second radio pipeline device providing service for the first UE, where the handover instruction information is used to indicate that the first UE is handed over to the second cell determined by the first determining module 230.

Optionally, in another embodiment, the collaborative controller 200 further includes:

a second sending module 240, configured to, when none of the at least one neighboring cell and the current serving cell meets the QoS requirement, send a maximum QoS capability of the first UE to the capability opening gateway, so that the capability opening gateway re-determines a QoS requirement of the first UE.

Optionally, the second radio pipeline device may include at least one of the following: a BSC, an e-NodeB, and an RNC.

Figure 14:
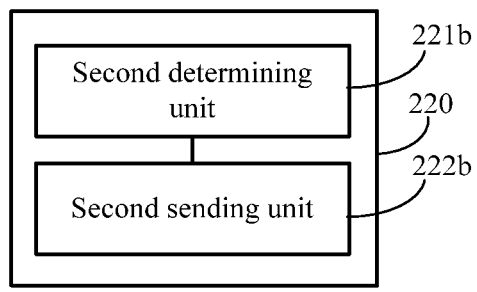
FIG. 14 is still another schematic block diagram of an access network collaborative controller according to an embodiment of the present invention.

Optionally, in another embodiment, as shown in FIG. 14, the controlling module 220 includes:

a second determining unit 221*b*, configured to determine, according to the request message and at least one access point AP available for the first UE, a first AP from the at least one AP; and a second sending unit 222*b*, configured to send an access instruction message to the first UE, where the access instruction message is used to indicate access of the first UE included in the first radio pipeline device to the first AP determined by the second determining unit 221*b*.

Figure 15:
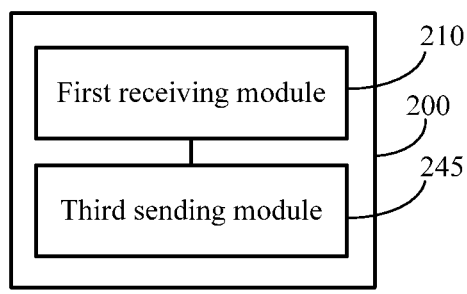
FIG. 15 is still another schematic block diagram of an access network collaborative controller according to an embodiment of the present invention.

Optionally, in another embodiment, as shown in FIG. 15, the first receiving module 210 is further configured to receive a first subscription message from the capability opening gateway, where the first subscription message is used to query capability information on at least one third radio pipeline device; and accordingly, the collaborative controller 200 further includes:

a third sending module 245, configured to send, according to the first subscription message received by the first receiving module 210, the capability information on the at least one third radio pipeline device to the capability opening gateway.

Figure 16:
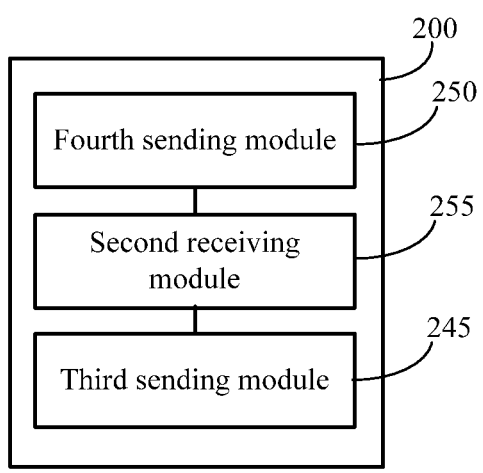
FIG. 16 is still another schematic block diagram of an access network collaborative controller according to an embodiment of the present invention.

Optionally, in another embodiment, as shown in FIG. 16, the collaborative controller 200 further includes:

a fourth sending module 250, configured to send a second subscription message to the at least one third radio pipeline device, where the second subscription message is used to indicate sending of the capability information on the at least one third radio pipeline device; and a second receiving module 255, configured to receive the capability information on the at least one third radio pipeline device, which is sent by the at least one third radio pipeline device according to the second subscription message sent by the fourth sending module 250; and accordingly, the third sending module 245 is specifically configured to send the capability information on the at least one third radio pipeline device, which is received by the second receiving module 255, to the capability opening gateway according to the first subscription message.

Figure 17:
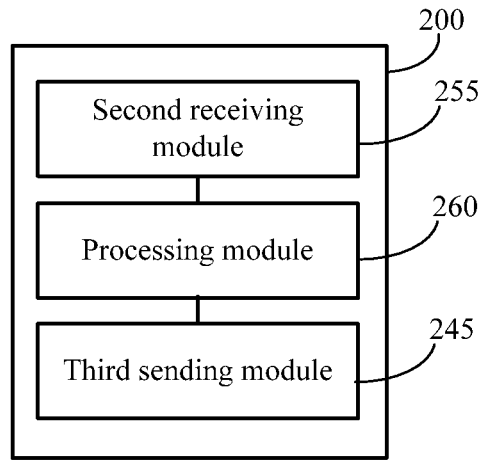
FIG. 17 is still another schematic block diagram of an access network collaborative controller according to an embodiment of the present invention.

Optionally, in another embodiment, as shown in FIG. 17, the collaborative controller 200 further includes:

a processing module 260, configured to perform system normalization processing on the capability information on the at least one third radio pipeline device, which is received by the second receiving module 255; and the third sending module 245 is specifically configured to send, according to the first subscription message, the capability information on the at least one third radio pipeline device to the capability opening gateway after system normalization processing performed by the processing module 260.

Figure 18:
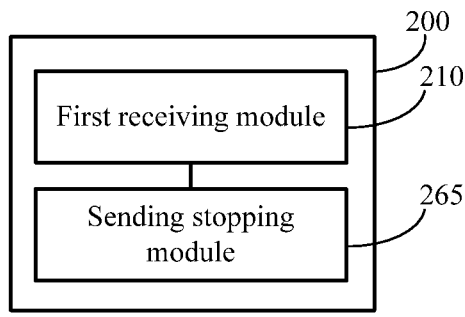
FIG. 18 is still another schematic block diagram of an access network collaborative controller according to an embodiment of the present invention.

Optionally, in another embodiment, as shown in FIG. 18, the first receiving module 210 is further configured to receive a subscription cancellation instruction from the capability opening gateway, where the subscription cancellation instruction is used to indicate that the collaborative controller stops sending the capability information on the at least one third radio pipeline device; and accordingly, the collaborative controller 200 further includes:

a sending stopping module 265, configured to stop, according to the subscription cancellation instruction received by the first receiving module 210, sending the capability information on the at least one third radio pipeline device.

Optionally, the third radio pipeline device includes at least one of the following: a BSC, an e-NodeB, an RNC, a radio AC, and a second UE. Accordingly, the capability information on the at least one third radio pipeline device includes at least one of the following: context information on the second UE, load information on the e-NodeB, load information on a base station controlled by the BSC or the RNC, signal quality information on the base station controlled by the BSC or the RNC, and load information and signal quality information on a radio access point AP controlled by the radio AC.

Figure 19:
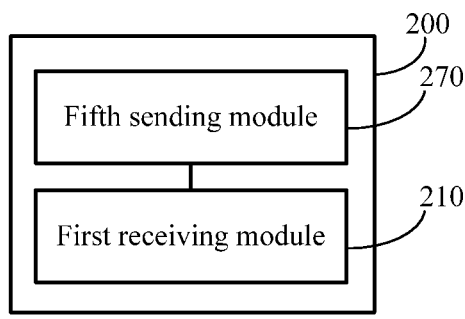
FIG. 19 is still another schematic block diagram of an access network collaborative controller according to an embodiment of the present invention.

Optionally, in another embodiment, as shown in FIG. 19, the collaborative controller 200 further includes:

a fifth sending module 270, configured to send an information query request to the capability opening gateway, where the information query request is used to query policy information on a fourth radio pipeline device; and the first receiving module 210 is further configured to receive the policy information on the fourth radio pipeline device, which is sent by the capability opening gateway according to the information query request sent by the fifth sending module 270.

Figure 20:
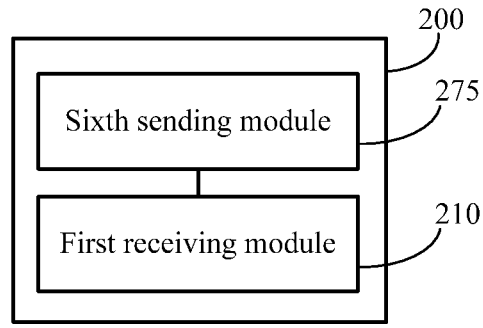
FIG. 20 is still another schematic block diagram of an access network collaborative controller according to an embodiment of the present invention.

Optionally, in another embodiment, as shown in FIG. 20, the collaborative controller 200 further includes:

a sixth sending module 275, configured to, before the first receiving module 210 receives a capability request message from the capability opening gateway, send a registration request message to the capability opening gateway, where the registration request message carries identifier information on at least one fifth radio pipeline device controlled by the collaborative controller, so that the capability opening gateway saves the identifier information on the at least one fifth radio pipeline device; and the first receiving module 210 is further configured to receive a registration request acknowledgement that is sent, according to the registration request message sent by the sixth sending module 275, by the capability opening gateway, where the registration request acknowledgement is used to indicate that the capability opening gateway has successfully saved the identifier information on the at least one fifth radio pipeline device.

Optionally, in another embodiment, the sixth sending module 275 is further configured to send an update request message to the capability opening gateway when the at least one fifth radio pipeline device changes, where the update request message is used to send the change, so that the capability opening gateway is further configured to update the saved identifier information on the at least one fifth radio pipeline device according to the update request message.

The access network collaborative controller 200 according to the embodiments of the present invention may correspond to a collaborative controller in the method for opening a radio pipeline capability according to the embodiments of the present invention. In addition, the foregoing and other operations and/or functions of the modules in the collaborative controller 200 are intended to implement processes corresponding to the methods in FIG. 1 to FIG. 10 respectively, which are not described herein again for brevity.

Therefore, by using the access network collaborative controller according to the embodiments of the present invention, information is transmitted between a radio pipeline device and a capability opening gateway and the radio pipeline device is controlled according to a requirement of the capability opening gateway, so as to open a radio pipeline capability on an RAN side for the capability opening gateway. This can reduce complexity of the capability opening gateway, improve scalability of a system for opening a radio pipeline capability, and control a radio network according to a service need, thereby optimizing services and enhancing user experience.

Figure 21:
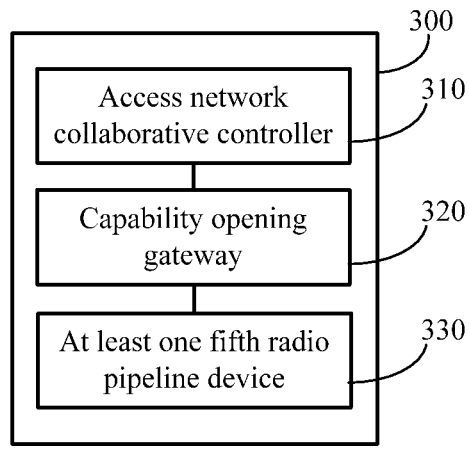
FIG. 21 is a schematic block diagram of a system for opening a radio pipeline capability according to an embodiment of the present invention.

FIG. 21 is a schematic block diagram of a system 300 for opening a radio pipeline capability according to an embodiment of the present invention. As shown in FIG. 21, the system 300 includes: an access network collaborative controller 310, a capability opening gateway 320, and at least one fifth radio pipeline device 330.

The access network collaborative controller 310 may be any one of the collaborative controllers described in FIG. 11 to FIG. 20; the capability opening gateway 320 may be the capability opening gateway in the method for opening a radio pipeline capability according to the embodiments of the present invention or may be the capability opening gateway in the foregoing description of the access network collaborative controller according to the embodiment of the present invention; and the at least one fifth radio pipeline device 330 may be the at least one fifth radio pipeline device in the method for opening a radio pipeline capability according to the embodiment of the present invention, but this embodiment of the present invention is not limited thereto.

Optionally, the at least one fifth radio pipeline device includes at least one of the following: a base station controller BSC, an evolved base station e-NodeB, a radio network controller RNC, a radio access controller AC, and a second UE.

A first interface is provided between the collaborative controller 310 and the capability opening gateway 320, where the first interface may be configured to transmit capability information on a radio pipeline device, which is sent by the collaborative controller to the capability opening gateway, and policy information on the radio pipeline device, which is delivered by the capability opening gateway to the collaborative controller, and may also be configured to transmit a service requirement of the capability opening gateway for a first UE. Optionally, a second interface may be provided between the collaborative controller and the e-NodeB, where the second interface may be configured to transmit state information on an LTE cell and a command of the collaborative controller for controlling the e-NodeB. Optionally, a third interface may be provided between the collaborative controller and the BSC/RNC, where the third interface may be configured to transmit cell state information and user information on the BSC/RNC and a command of the collaborative controller for controlling the BSC/RNC. Optionally, a fourth interface may be provided between the collaborative controller and the AC, where the fourth interface is configured to transmit WI-FI state information and a command of the collaborative controller for controlling the AC. Optionally, a fifth interface may be provided between the collaborative controller and the first UE, where the fifth interface may be configured to support the collaborative controller to discover and select a WI-FI access network. However, the embodiment of the present invention is not limited thereto.

Therefore, with the system for opening a radio pipeline capability according to the embodiments of the present invention, and by using an access network collaborative controller, information is transmitted between a radio pipeline device and a capability opening gateway, and the radio pipeline device is controlled according to a requirement of the capability opening gateway, so as to open a radio pipeline capability on an RAN side for the capability opening gateway. This can reduce complexity of the capability opening gateway, improve scalability of the system for opening a radio pipeline capability, and control a radio network according to a service need, thereby optimizing services and enhancing user experience.

Figure 22:
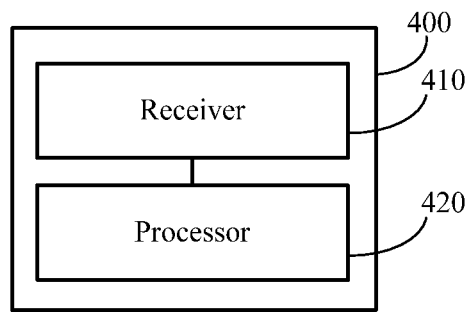
FIG. 22 is schematic block diagram of an access network collaborative controller according to another embodiment of the present invention.

FIG. 22 is a schematic block diagram of an access network collaborative controller 400 according to another embodiment of the present invention. As shown in FIG. 22, the collaborative controller 400 includes:

a receiver 410, configured to receive a request message from a capability opening gateway, where the request message carries a service requirement of a first user equipment UE; and a processor 420, configured to control a first radio pipeline device according to the request message received by the receiver 410 so that a radio pipeline resource allocated to the first UE meets the service requirement.

Therefore, by using the access network collaborative controller according to the embodiments of the present invention, information is transmitted between a radio pipeline device and a capability opening gateway, and the radio pipeline device is controlled according to a requirement of the capability opening gateway, so as to open a radio pipeline capability on an RAN side for the capability opening gateway. This can reduce complexity of the capability opening gateway, improve scalability of a system for opening a radio pipeline capability, and control a radio network according to a service need, thereby optimizing services and enhancing user experience.

Optionally, the first radio pipeline device includes at least one of the following: a base station controller BSC, an evolved base station e-NodeB, a radio network controller RNC, a radio access controller AC, and the first UE.

Optionally, the receiver 410 is specifically configured to receive a radio access technology RAT request message from the capability opening gateway, where the RAT request message carries identifier information on the first UE and a quality of service QoS requirement of the first UE.

Optionally, the processor 420 is specifically configured to determine a first cell meeting the QoS requirement according to the RAT request message, a radio network system supported by the first UE, and signal quality information on a serving cell and at least one neighboring cell of the first UE.

Figure 23:
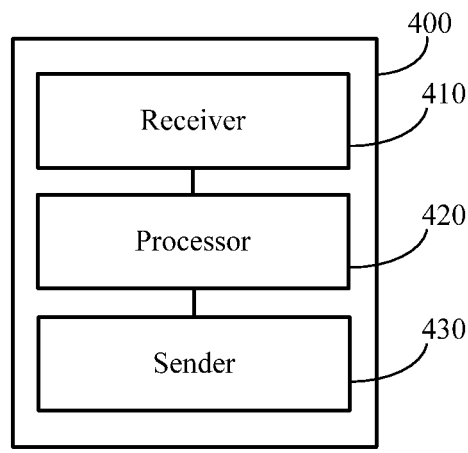
FIG. 23 is another schematic block diagram of an access network collaborative controller according to another embodiment of the present invention.

Accordingly, as shown in FIG. 23, the collaborative controller 400 further includes:

a transmitter 430, configured to send bearer control information to a second radio pipeline device providing service for the first UE, where the bearer control information is used to indicate that the first UE is carried in the first cell determined by the processor 420.

Optionally, in another embodiment, the processor 420 is further configured to determine, after the transmitter 430 sends the bearer control information to the second radio pipeline device providing service for the first UE and when the current serving cell of the first UE does not meet the QoS requirement, a second cell meeting the QoS requirement from the at least one neighboring cell of the first UE; and the transmitter 430 is further configured to send handover instruction information to the second radio pipeline device providing service for the first UE, where the handover instruction information is used to indicate that the first UE is handed over to the second cell determined by the processor 420.

Optionally, in another embodiment, the transmitter 430 is further configured to, when none of the at least one neighboring cell and the current serving cell meets the QoS requirement, send a maximum QoS capability of the first UE to the capability opening gateway, so that the capability opening gateway re-determines a QoS requirement of the first UE.

Optionally, the second radio pipeline device may include at least one of the following: a BSC, an e-NodeB, and an RNC.

Optionally, in another embodiment, the processor 420 is further configured to determine, according to the request message and at least one access point AP available for the first UE, a first AP from the at least one AP; and the transmitter 430 is further configured to send an access instruction message to the first UE, where the access instruction message is used to indicate access of the first UE included in the first radio pipeline device to the first AP determined by the processor 420.

Optionally, in another embodiment, the receiver 410 is further configured to receive a first subscription message from the capability opening gateway, where the first subscription message is used to query capability information on at least one third radio pipeline device; and the transmitter 430 is further configured to send the capability information on the at least one third radio pipeline device to the capability opening gateway according to the first subscription message received by the receiver 410.

Optionally, in another embodiment, the transmitter 430 is further configured to send a second subscription message to the at least one third radio pipeline device, where the second subscription message is used to indicate sending of the capability information on the at least one third radio pipeline device;

the receiver 410 is further configured to receive the capability information on the at least one third radio pipeline device, which is sent by the at least one third radio pipeline device according to the second subscription message sent by the transmitter 430; and the transmitter 430 is specifically configured to send, according to the first subscription message, the capability information on the at least one third radio pipeline device, which is received by the receiver 410, to the capability opening gateway.

Optionally, in another embodiment, the processor 420 is further configured to perform system normalization processing on the capability information on the at least one third radio pipeline device, which is received by the receiver 410; and the transmitter 430 is specifically configured to send, according to the first subscription message, the capability information on the at least one third radio pipeline device to the capability opening gateway after system normalization processing performed by the processor 420.

Optionally, in another embodiment, the receiver 410 is further configured to receive a subscription cancellation instruction from the capability opening gateway, where the subscription cancellation instruction is used to indicate that the collaborative controller stops sending the capability information on the at least one third radio pipeline device; and accordingly, the processor 420 is further configured to stop, according to the subscription cancellation instruction received by the receiver 410, sending the capability information on the at least one third radio pipeline device.

Optionally, the third radio pipeline device includes at least one of the following: a BSC, an e-NodeB, an RNC, a radio AC, and a second UE. Accordingly, the capability information on the at least one third radio pipeline device includes at least one of the following: context information on the second UE, load information on the e-NodeB, load information on a base station controlled by the BSC or the RNC, signal quality information on the base station controlled by the BSC or the RNC, and load information and signal quality information on a radio access point AP controlled by the radio AC.

Optionally, in another embodiment, the transmitter 430 is further configured to send an information query request to the capability opening gateway, where the information query request is used to query policy information on a fourth radio pipeline device; and the receiver 410 is further configured to receive the policy information on the fourth radio pipeline device, which is sent by the capability opening gateway according to the information query request sent by the transmitter 430.

Optionally, in another embodiment, the transmitter 430 is further configured to, before the receiver 410 receives a capability request message from the capability opening gateway, send a registration request message to the capability opening gateway, where the registration request message carries identifier information on at least one fifth radio pipeline device controlled by the collaborative controller, so that the capability opening gateway saves the identifier information on the at least one fifth radio pipeline device; and the receiver 410 is further configured to receive a registration request acknowledgement that is sent, according to the registration request message sent by the transmitter 430, by the capability opening gateway, where the registration request acknowledgement is used to indicate that the capability opening gateway has successfully saved the identifier information on the at least one fifth radio pipeline device.

Optionally, in another embodiment, the transmitter 430 is further configured to send an update request message to the capability opening gateway when the at least one fifth radio pipeline device changes, where the update request message is used to send the change, so that the capability opening gateway is further configured to update the saved identifier information on the at least one fifth radio pipeline device according to the update request message.

The access network collaborative controller 400 according to the embodiments of the present invention may correspond to the collaborative controller in the method for opening a radio pipeline capability according to the embodiments of the present invention. In addition, the foregoing and other operations and/or functions of the modules in the collaborative controller 400 are intended to implement processes corresponding to the methods in FIG. 1 to FIG. 10 respectively, which are not described herein again for brevity.

Therefore, by using the access network collaborative controller according to the embodiments of the present invention, information is transmitted between a radio pipeline device and a capability opening gateway, and the radio pipeline device is controlled according to a requirement of the capability opening gateway, so as to open a radio pipeline capability on an RAN side for the capability opening gateway. This can reduce complexity of the capability opening gateway, improve scalability of a system for opening a radio pipeline capability, and control a radio network according to a service need, thereby optimizing services and enhancing user experience.

Figure 24:
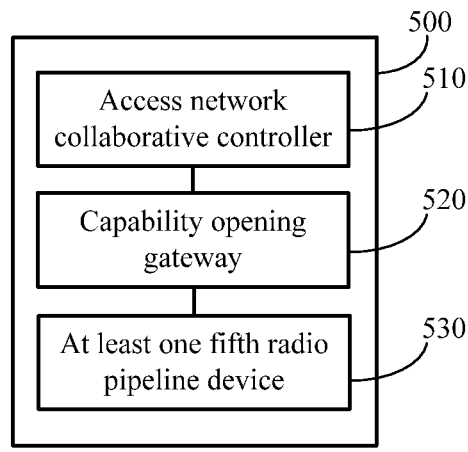
FIG. 24 is a schematic block diagram of a system for opening a radio pipeline capability according to another embodiment of the present invention.

FIG. 24 is a schematic block diagram of a system 500 for opening a radio pipeline capability according to an embodiment of the present invention. As shown in FIG. 24, the system 500 includes: an access network collaborative controller 510, a capability opening gateway 520, and at least one fifth radio pipeline device 530.

The access network collaborative controller 510 may be the collaborative controller described in FIG. 22 or FIG. 23; the capability opening gateway 520 may be the capability opening gateway in the method for opening a radio pipeline capability according to the embodiment of the present invention or may be the capability opening gateway in the foregoing description of the access network collaborative controller according to the embodiment of the present invention; and the at least one fifth radio pipeline device 530 may be the at least one fifth radio pipeline device in the method for opening a radio pipeline capability according to the embodiment of the present invention, but the embodiment of the present invention is not limited thereto.

Optionally, the at least one fifth radio pipeline device includes at least one of the following: a base station controller BSC, an evolved base station e-NodeB, a radio network controller RNC, a radio access controller AC, and a second UE.

A first interface is provided between the collaborative controller and the capability opening gateway, where the first interface may be configured to transmit capability information on a radio pipeline device, which is sent by the collaborative controller to the capability opening gateway, and policy information on the radio pipeline device, which is delivered by the capability opening gateway to the collaborative controller, and may also be configured to transmit a service requirement of the capability opening gateway for a first UE. Optionally, a second interface may be provided between the collaborative controller and the e-NodeB, where the second interface may be configured to transmit state information on an LTE cell and a command of the collaborative controller for controlling the e-NodeB. Optionally, a third interface may be provided between the collaborative controller and the BSC/RNC, where the third interface may be configured to transmit cell state information and user information on an RAN and a command of the collaborative controller for controlling the BSC/RNC. Optionally, a fourth interface may be further provided between the collaborative controller and the AC, where the fourth interface is configured to transmit WI-FI state information and a command of the collaborative controller for controlling the AC. Optionally, a fifth interface may be further provided between the collaborative controller and the first UE, where the fifth interface may be configured to support the collaborative controller to discover and select a WI-FI access network. However, the embodiment of the present invention is not limited thereto.

Therefore, with the system for opening a radio pipeline capability according to the embodiments of the present invention, and by using an access network collaborative controller, information is transmitted between a radio pipeline device and a capability opening gateway, and the radio pipeline device is controlled according to a requirement of the capability opening gateway, so as to open a radio pipeline capability on an RAN side for the capability opening gateway. This can reduce complexity of the capability opening gateway, improve scalability of the system for opening a radio pipeline capability, and control a radio network according to a service need, thereby optimizing services and enhancing user experience.

It should be understood that the term "and/or" in the embodiments of the present invention denotes only an association relationship between associated objects, and may represent three relationships. For example, A and/or B may represent the following three cases: only A exists, both A and B exist, and only B exists. In addition, the character "/" herein generally means that associated objects are in an "or" relationship.

Persons of ordinary skill in the art can be aware that, the steps of methods and units described with reference to the embodiments disclosed in this specification can be implemented by electronic hardware, computer software, or a combination thereof. To clearly describe the interchangeability between hardware and software, the foregoing has generally described the steps and compositions of the embodiments according to functions. Whether the functions are performed by hardware or software depends on particular applications and design constraint conditions of the technical solutions. Persons of ordinary skill in the art may use different methods to implement the described functions for each particular application, but it should not be considered that the implementation goes beyond the scope of the present invention.

It can be clearly understood by persons skilled in the art that, for the purpose of convenient and brief description, for detailed working processes of the foregoing system, apparatus, and units, reference may be made to corresponding processes in the foregoing method embodiments, and details are not described herein again.

In the several embodiments provided in the present application, it should be understood that the disclosed system, apparatus, and method may be implemented in other manners. For example, the described apparatus embodiments are merely exemplary. For example, the division of units is merely a division of logical functions and there may be other forms of division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions used to enable a computer device (which may be a personal computer, a server, or a network device) to implement all or a part of the steps of the methods described in the embodiments of the present invention. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific embodiments of the present invention, but are not intended to limit the protection scope of the present invention. Any modification or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A method comprising:
    receiving, by an access network collaborative controller, a request message from a capability opening gateway outside a radio network, wherein the request message carries a service requirement of a first user equipment (UE) in the radio network; and
    controlling, by the access network collaborative controller, a first radio pipeline device in a radio network system in the radio network according to the request message so that a radio pipeline resource from the first radio pipeline device allocated to the first UE meets the service requirement;
    wherein the request message comprises identifier information of the first UE, a quality of service (QoS) requirement of the first UE, and a list of first UE-subscribed radio network systems in the radio network; and
    wherein the radio network system is on the list of first UE-subscribed radio network systems.

2. The method according to claim 1, wherein the first radio pipeline device is at least one of the following: a base station controller (BSC), an evolved base station (e-NodeB), a radio network controller (RNC), a radio access controller (AC), and the first UE.

3. The method according to claim 1, wherein controlling, by the access network collaborative controller, the first radio pipeline device according to the request message to instruct a radio pipeline resource allocated to the first UE meets the service requirement comprises:
    identifying, by the access network collaborative controller, a first cell as a serving cell for the first UE that meets the QoS requirement according to the request message, a radio network system supported by the first UE, and signal quality information on the first cell and at least one neighboring cell of the first UE, wherein the first radio pipeline device is serving the first cell.

4. The method according to claim 3, wherein, after identifying the first cell as the serving cell the method further comprises:
    determining, by the access network collaborative controller, that a second cell is better meeting the QoS requirement from the at least one neighboring cell of the first UE than the first cell; and
    sending, by the access network collaborative controller, handover instruction information to a second radio pipeline device serving the second cell to become a cell currently providing service for the first UE, wherein the handover instruction information indicates that the first UE is handed over to the second cell.

5. The method according to claim 3, further comprising when none of the at least one neighboring cell and the serving cell meets the QoS requirement, sending, by the access network collaborative controller, a maximum QoS capability of the first UE to the capability opening gateway, to instruct the capability opening gateway re-determines a QoS requirement of the first UE.

6. The method according to claim 4, wherein the second radio pipeline device is at least one of the following: a BSC, an e-NodeB, and an RNC.

7. The method according to claim 1, wherein controlling, by the access network collaborative controller, a first radio pipeline device according to the request message comprises:
    determining, by the access network collaborative controller according to the request message and at least one access point AP available for the first UE, a first AP from the at least one AP; and
    sending, by the access network collaborative controller, an access instruction message to the first UE comprised in the first radio pipeline device, wherein the access instruction message is used to indicate access of the first UE to the first AP.

8. The method according to claim 1, further comprising:
    receiving, by the access network collaborative controller, a first subscription message from the capability opening gateway, wherein the first subscription message queries for capability information of the first radio pipeline device; and
    sending, by the access network collaborative controller according to the first subscription message, the capability information of the first radio pipeline device to the capability opening gateway.

9. The method according to claim 8, further comprising:
    sending, by the access network collaborative controller, a second subscription message to the first radio pipeline device, wherein the second subscription message indicates sending the capability information of the first radio pipeline device; and receiving, by the access network collaborative controller, the capability information of the first radio pipeline device, wherein the capability information is sent by the first radio pipeline device according to the second subscription message.

10. The method according to claim 9, wherein, after the receiving, by the access network collaborative controller, the capability information of the first radio pipeline device, the method further comprises:

performing, by the access network collaborative controller, system normalization processing on the capability information of the first radio pipeline device; and sending, by the access network collaborative controller according to the first subscription message, capability information of the first radio pipeline device to the capability opening gateway comprises sending, by the access network collaborative controller according to the first subscription message, the capability information of the first radio pipeline device to the capability opening gateway after system normalization processing.

11. The method according to claim 8, further comprising:

receiving, by the access network collaborative controller, a subscription cancellation instruction from the capability opening gateway, wherein the subscription cancellation instruction indicates that the access network collaborative controller stops sending the capability information of the first radio pipeline device; and stopping, by the access network collaborative controller according to the subscription cancellation instruction, sending the capability information of the first radio pipeline device.

12. The method according to claim 8, wherein the first radio pipeline device is at least one of the following: a BSC, an e-NodeB, an RNC, a radio AC, and the first UE, and wherein the capability information of the first radio pipeline device comprises at least one of the following: context information of the first UE, load information on the e-NodeB, load information on a base station controlled by the BSC or the RNC, signal quality information on the base station controlled by the BSC or the RNC, and load information and signal quality information on a radio access point AP controlled by the radio AC.

13. The method according to claim 1, wherein, before the receiving, by the access network collaborative controller, a capability request message from a capability opening gateway outside a radio network, the method further comprises:

sending, by the access network collaborative controller, a registration request message to the capability opening gateway, wherein the registration request message carries identifier information of the first radio pipeline device controlled by the access network collaborative controller, to instruct the capability opening gateway save the identifier information of the first radio pipeline device; and receiving, by the access network collaborative controller, a registration request acknowledgement that is sent, according to the registration request message, by the capability opening gateway, wherein the registration request acknowledgement indicates that the capability opening gateway has successfully saved the identifier information of the first radio pipeline device.

14. The method according to claim 13, further comprising:

sending, by the access network collaborative controller, an update request message to the capability opening gateway when there is a change in the first radio pipeline device, wherein the update request message instructs about the change, so that the capability opening gateway is further configured to update the identifier information of the first radio pipeline device according to the update request message.

15. An access network collaborative controller, comprising:

a receiver configured to receive a request message from a capability opening gateway outside a radio network, wherein the request message carries a service requirement of a first user equipment (UE) in the radio network; and at least one processor configured to control a first radio pipeline device in a radio network system in the radio network according to the request message received by the receiver so that a radio pipeline resource from the first radio pipeline device allocated to the first UE meets the service requirement;

wherein the request message comprises identifier information on the first UE, a quality of service (QoS) requirement of the first UE, and a list of first UE-subscribed radio network systems in the radio network; and wherein the radio network system is one on the list of first UE-subscribed radio network systems.

16. The access network collaborative controller according to claim 15, wherein the first radio pipeline device is at least one of the following: a base station controller (BSC), an evolved base station (e-NodeB), a radio network controller (RNC), a radio access controller (AC), and the first UE.

17. The access network collaborative controller according to claim 15, wherein the at least one processor is further configured to identify a first cell as a serving cell for the first UE that meets the QoS requirement according to the request message, a radio network system supported by the first UE, and signal quality information on the first cell and at least one neighboring cell of the first UE wherein the first radio pipeline device is serving the first cell.

18. The access network collaborative controller according to claim 17 further comprising a transmitter, wherein the at least one processor is further configured to determine, after the at least one processor identifying the first cell as the serving cell, a second cell is better meeting the QoS requirement from the at least one neighboring cell of the first UE than the first cell, wherein the transmitter is configured to send handover instruction information to a second radio pipeline device serving the second cell to become a cell currently providing service for the first UE, and wherein the handover instruction information indicates that the first UE is handed over to the second cell determined by the at least one processor.

19. The access network collaborative controller according to claim 17, further comprising a transmitter is configured to, when none of the at least one neighboring cell and the serving cell meets the QoS requirement, send a maximum QoS capability of the first UE to the capability opening gateway, to instruct the capability opening gateway to re-determine a QoS requirement of the first UE.

20. The access network collaborative controller according to claim 18, wherein the second radio pipeline device is at least one of the following: a BSC, an e-NodeB, and an RNC.

21. The access network collaborative controller according to claim 15, wherein the at least one processor is further configured to determine, according to the request message and signal quality information on at least one access point (AP) available for the first UE, a first AP from the at least one AP, and further comprising a transmitter configured to send an access instruction message to the first UE comprised in the first radio pipeline device, wherein the access instruction message is used to indicate access of the first UE to the first AP determined by the at least one processor.

22. The access network collaborative controller according to claim 15, wherein the receiver is further configured to receive a first subscription message from the capability opening gateway, wherein the first subscription query message queries for capability information of the first radio pipeline device and further comprising a transmitter configured to send the capability information of the first radio pipeline device to the capability opening gateway according to the first subscription message received by the receiver.

23. The access network collaborative controller according to claim 22, wherein the transmitter is configured to send a second subscription message to the first radio pipeline device, wherein the second subscription message indicates sending the capability information on the first radio pipeline device, wherein the receiver is configured to receive the capability information of the first radio pipeline device, wherein the capability information is sent by the first radio pipeline device according to the second subscription message sent by the transmitter.

24. The access network collaborative controller according to claim 23, wherein the at least one processor is configured to perform system normalization processing on the capability information of the first radio pipeline device, which is received by the receiver, and wherein the transmitter is specifically configured to send, according to the first subscription message, the capability information of the first radio pipeline device to the capability opening gateway after system normalization processing performed by the at least one processor.

25. The access network collaborative controller according to claim 22, wherein the transmitter is further configured to receive a subscription cancellation instruction from the capability opening gateway, wherein the subscription cancellation instruction indicates that the access network collaborative controller stops sending the capability information of the first radio pipeline device, and wherein the at least one processor is configured to stop, according to the subscription cancellation instruction received by the receiver, sending the capability information of the first radio pipeline device.

26. The access network collaborative controller according to claim 22, wherein the first radio pipeline device is at least one of the following: a BSC, an e-NodeB, an RNC, a radio AC, and the first UE, and wherein the capability information of the first radio pipeline device comprises at least one of the following: context information of the first UE, load information on the e-NodeB, load information on a base station controlled by the BSC or the RNC, signal quality information on the base station controlled by the BSC or the RNC, as well as load information and signal quality information on a radio access point AP controlled by the radio AC.

27. The access network collaborative controller according to claim 15, further comprising a transmitter configured to, before the receiver receives a capability request message from the capability opening gateway outside a radio network, send a registration request message to the capability opening gateway, wherein the registration request message carries identifier information of the first radio pipeline device controlled by the access network collaborative controller, to instruct the capability opening gateway save the identifier information of the first radio pipeline device, wherein the receiver is further configured to receive a registration request acknowledgement that is sent, according to the registration request message sent by the transmitter, by the capability opening gateway, wherein the registration request acknowledgement is used to indicate that the capability opening gateway has successfully saved the identifier information of the first radio pipeline device.

28. The access network collaborative controller according to claim 27, wherein the transmitter is further configured to send an update request message to the capability opening gateway when there is a change in the first radio pipeline device, wherein the update request message instructs about the change, so that the capability opening gateway is further configured to update the identifier information of the first radio pipeline device according to the update request message.

29. A system for opening a radio pipeline capability, wherein the system comprises the access network collaborative controller according to claim 15, a capability opening gateway, and a first radio pipeline device.

30. The system according to claim 29, wherein the first radio pipeline device is at least one of the following: a base station controller (BSC), an evolved base station (e-NodeB), a radio network controller (RNC), a radio access controller (AC), and a first UE.

31. The access network collaborative controller according to claim 15, wherein the request message is a radio access technology (RAT) request message.

32. The method according to claim 1, wherein the request message is a radio access technology (RAT) request message.

33. A network access collaborative controller, comprising:
a processor; and
a non-transitory computer-readable storage medium storing a program to be executed by the processor, the program including instructions for:
    sending capability information of a radio pipeline device in a radio network to a capability opening gateway outside the radio network;
    receiving a request message from the capability opening gateway, wherein the request message carries a service requirement of a user equipment (UE) in the radio network; and
    controlling the radio pipeline device in the radio network, according to the request message so that a radio pipeline resource allocated to the UE meets the service requirement of the UE, wherein the capability opening gateway makes the radio pipeline resource available to a third party application according to the capability information of the radio pipeline device;
    wherein the instructions for sending the capability information of the radio pipeline device comprise instructions for:
        receiving a first subscription message from the capability opening gateway, wherein the first subscription message queries capability information of the radio pipeline device;
        sending a second subscription message to the radio pipeline device, wherein the second subscription message queries the radio pipeline device for the capability information of the radio pipeline device;
        receiving the capability information of the radio pipeline device, wherein the capability information is sent by the radio pipeline device according to the second subscription message; and sending the capability information of the radio pipeline device to the capability opening gateway according to the first subscription message.

* * * * *